United States Patent [19]
Raab

[11] Patent Number: 5,623,336
[45] Date of Patent: Apr. 22, 1997

[54] METHOD AND APPARATUS FOR ANALYZING OPTICAL FIBERS BY INDUCING BRILLOUIN SPECTROSCOPY

[76] Inventor: Michael Raab, Weildorfer Hardt 9, Salem 1, Germany

[21] Appl. No.: 235,466

[22] Filed: Apr. 29, 1994

[30] Foreign Application Priority Data

Apr. 30, 1993 [DE] Germany .......................... 43 14 189.7

[51] Int. Cl.$^6$ .................................................. G01N 21/88
[52] U.S. Cl. .............................................................. 356/73.1
[58] Field of Search ..................................... 356/73.1, 350

[56] References Cited

U.S. PATENT DOCUMENTS

| Re. 34,972 | 6/1995 | Horiguchi et al. | 356/73.1 |
|---|---|---|---|
| 5,383,207 | 1/1995 | Culverhouse et al. | 356/43 X |
| 5,408,317 | 4/1995 | Dyes et al. | 356/350 |

OTHER PUBLICATIONS

Shibata et al., Longitudinal Acoustic Modes and Brillouin–Gain Spectra for GeO$_2$–Doped Core Single–Mode Fibers, J.Opt.Soc.AM.B. vol. 6, No. 6, 1167–1174 (1989), Jun.

Tkach et al., Spontaneous Brillouin Scattering for Single-Mode Optical Fibre Characterization, Electronics Letters, vol. 22, No. 19, 1011–1013 (1986), 11 Sep.

Tsun et al., Wavelength Dependences of Brillouin Frequency Shifts of Optical Fibres in 1.55 μm Wavelength REgion, Electronics Letters, vol. 27, No. 19 1764–1765 (1991), 12 Sep.

Tsun et al., Novel Method Using Spectral Probe Signals to Measure Brillouin Gain Spectra of Pure Silica Core Fibres, Electronics Letters, vol. 28, No. 3, 247–249 (1992) (30 Jan.).

*Primary Examiner*—Vincent P. McGraw
*Attorney, Agent, or Firm*—James Creighton Wray

[57] ABSTRACT

For the noninvasive investigation of optical fiber lines by means of heterodyne Brillouin spectroscopy light from a pumplaser (10) is directed into one end of the optical fiber line under investigation (16), so that spontaneous Brillouin backscattering is induced in the fiber (16). The light, which is backscattered by spontaneous Brillouin scattering, is superimposed to a lightwave, which is derived from the pumplaser (10), and heterodyned at the detector (46). The output signal from the detector is fed into a spectrum analyzer (50). A part of the light from the pumplaser (10) is directed into a ring resonator (38). The lightwave, which is derived from the pumplaser (10) and which is superimposed with the light, which is backscattered from the optical fiber line under investigation (16), is generated by stimulated Brillouin scattering inside the ring resonator (38).

26 Claims, 2 Drawing Sheets

METHOD AND APPARATUS FOR ANALYZING OPTICAL FIBERS BY INDUCING BRILLOUIN SPECTROSCOPY

BACKGROUND OF THE INVENTION

The invention manifests itself in a device suitable for the investigation of optical fibers by means of heterodyne-Brillouin-spectroscopy, where light from a pump laser is directed into one end of an optical fiber line under investigation in such a way to excite spontaneous Brillouin backscattering within this optical fiber line, which is superimposed onto a lightwave, which is derived from the same pumplaser, directed to a detector, from which the output signal is fed into a spectrum analyzer.

Specifically, the invention is related to a non-invasive investigation of permanently installed fiber optic transmission lines, to identify the type of fiber in a fiber optic network. Optical fibers can vary by type and quantity of the dopant and by geometrical parameters, which is especially true for fibers from different sources. It is often necessary to find out, which type of optical fiber is installed at a specific part of a fiber optic network.

A pumplaser excites on its way through a fiber optic transmission line a spontaneous Brillouin scattering. The physical mechanism can be described as scattering of pumplaser light at acoustic waves, which are statistically distributed within the optical fiber. The frequency of the preferably backscattered light is downshifted relative to the pumplaser frequency. The backscattered Brillouin light has a spectrum with one or more peaks, which is characteristic for the specific optical fiber. Like a fingerprint, the spectrum allows for an identification of the optical fiber under test.

To measure the spontaneous Brillouin spectrum in an optical fiber, the backscattered light is superimposed to a lightwave with a specific reference frequency. Both light beams are heterodyned at a photodetector. Beat signals between the reference lightwave and the backscattered Brillouin light can then be analyzed. The method is called heterodyne Brillouin spectroscopy.

In a paper entitled "Longitudinal Acoustic Modes and Brillouin Gain Spectra for $GeO_2$-doped Core Single-Mode Fibers" from Shibata, Okamoto and Azuma, published in the "Journal of the Optical Society of America", Volume 6, pp 1167–1174 (1989), an experimental device is described to measure the Brillouin gain profile in optical fiber lines. Light from a pumplaser is directed through an optical isolator and a mechanical chopper into one end of the fiber under test. A second, less intense laser is sent into the other end of the optical fiber line as a probe in the opposite direction relative to the pump laser. The frequency of the probe laser is scanned. Its intensity is detected by a photodetector, phase sensitively demodulated with respect to the chopper frequency and displayed as a function of frequency of the probe laser. In this setup the interaction of the pumplaser with the optical fiber medium can be monitored with the probelaser with high sensitivity. Nevertheless, this experiment requires two lasers of good coherence. Both ends of the optical fiber line under test must be accessible. The frequency scale results from a scan of the probelaser and therefore has to be calibrated, which requires further action.

Another device is described in a paper by Tsun, Wada, Sakai, and Yamauchi, entitled "Novel Method Using White Spectral Probe Signals to Measure Brillouin Gain Spectra of Pure Silica Core Fibres", published in "Electronics Letters", Volume 28, pp. 247–249 (1992). Light from a pumplaser is injected from one end into an optical fiber line under test, inducing spontaneous Brillouin backscattering, whereas from the other end a probe lightwave with a white spectral characteristic is sent into the optical fiber line against the pumplaser direction. Both backwards travelling lightbeams, the spontaneous Brillouin backscattering and the white probelight are superimposed at a photodetector by means of a branching device. An electrical spectrum analyzer processes the output of the photodetector. This device requires, as well as the first method described above, access to both ends of the optical fiber under test.

A paper from Tkach, Chraplyvy and Derosier, entitled "Spontaneous Brillouin Scattering for Single-Mode Optical Fibre Characterization" published in "Electronics Letters", Volume 22, pp. 1011–1013 (1986) communicates about a device, where, via an optical isolator and a branching device, light from a pumplaser is directed into an optical fiber under test to induce spontaneous Brillouin backscattering. A part of the pumplight is diverted at the branching device and sent to a mirror, where it is reflected in itself. A part of this backwards travelling pumplight is combined with a part of the spontaneous Brillouin scattering at the branching device and superimposed at the photodetector. The difference frequency spectrum is displayed with a spectrum analyzer.

A paper from Tsun, Wada and Yamauchi, entitled "Wavelength Dependence of Brillouin Frequency Shifts of Optical Fibres in the 1.55 µm Wavelength Region" published in "Electronics Letters", Vol. 27, pp. 1764–1765 (1991) describes a similar device. A part of the light of a pumplaser is branched off by a first branching device and sent through an optical isolator to a second branching device. There it is combined with a part of the pumplaser induced spontaneous Brillouin spectrum from the optical fiber under test, which was travelling backwards through the first branching device, another optical isolator to the second branching device. The heterodyning of the two lightbeams takes place at the photodetector. The output signal is routed to a spectrum analyzer.

The last two papers mentioned describe devices, where a part of the pumplaser light is superimposed with the pumplaser-induced spontaneous Brillouin backscattering at a suitable photodetector. The difference frequency spectrum contains the full information about the specific Brillouin spectrum or Brillouin gain profile. Calibration of the frequency scale is given by processing with an electronic spectrum analyzer. In contrast to the pump/probe devices mentioned before, only one end of the optical fiber under test must be accessible.

The difference frequency spectrum to be measured corresponds to the frequencies of the acoustic phonons, which participate in the Brillouin scattering process. Depending on the pumplaser wavelength, these frequencies are in the 10 to 20 GHz range. Unavoidable frequency drifts of the unreferenced pumplaser degrade the frequency resolution of such devices to some MHz.

SUMMARY OF THE INVENTION

It is an object of the invention to configure a device for the investigation of optical fiber lines by means of heterodyne-Brillouin-spectroscopy in such a way, that the spontaneous Brillouin spectrum can be measured with high resolution in a simple manner with access to only one end of the optical fiber line.

According to the invention, this object is achieved by providing a fiber optic ring resonator, in which a part of the pumplaser is directed to, and where this particular lightwave, which is derived from that pumplight circulating inside the resonator, and which is superimposed onto the backscattered light from the optical fiber line under investigation, is formed by stimulated Brillouin scattering inside the fiber optic ring resonator.

The pumplaser firstly excites spontaneous Brillouin scattering in the optical fiber line. Secondly, it creates a ring laser in the fiber optic ring resonator by means of stimulated Brillouin scattering. The light from this Brillouin ring laser serves as a reference laser and local oscillator with an extremely narrow emission linewidth of less than a kilohertz. Further features and advantages of the invention will be apparent from the description below.

BRIEF DESCRIPTION OF THE DRAWINGS

The invention is described, by way of example only, with reference to the accompanying drawings, wherein.

DESCRIPTION OF THE PREFERRED EMBODIMENT

Figure 1:
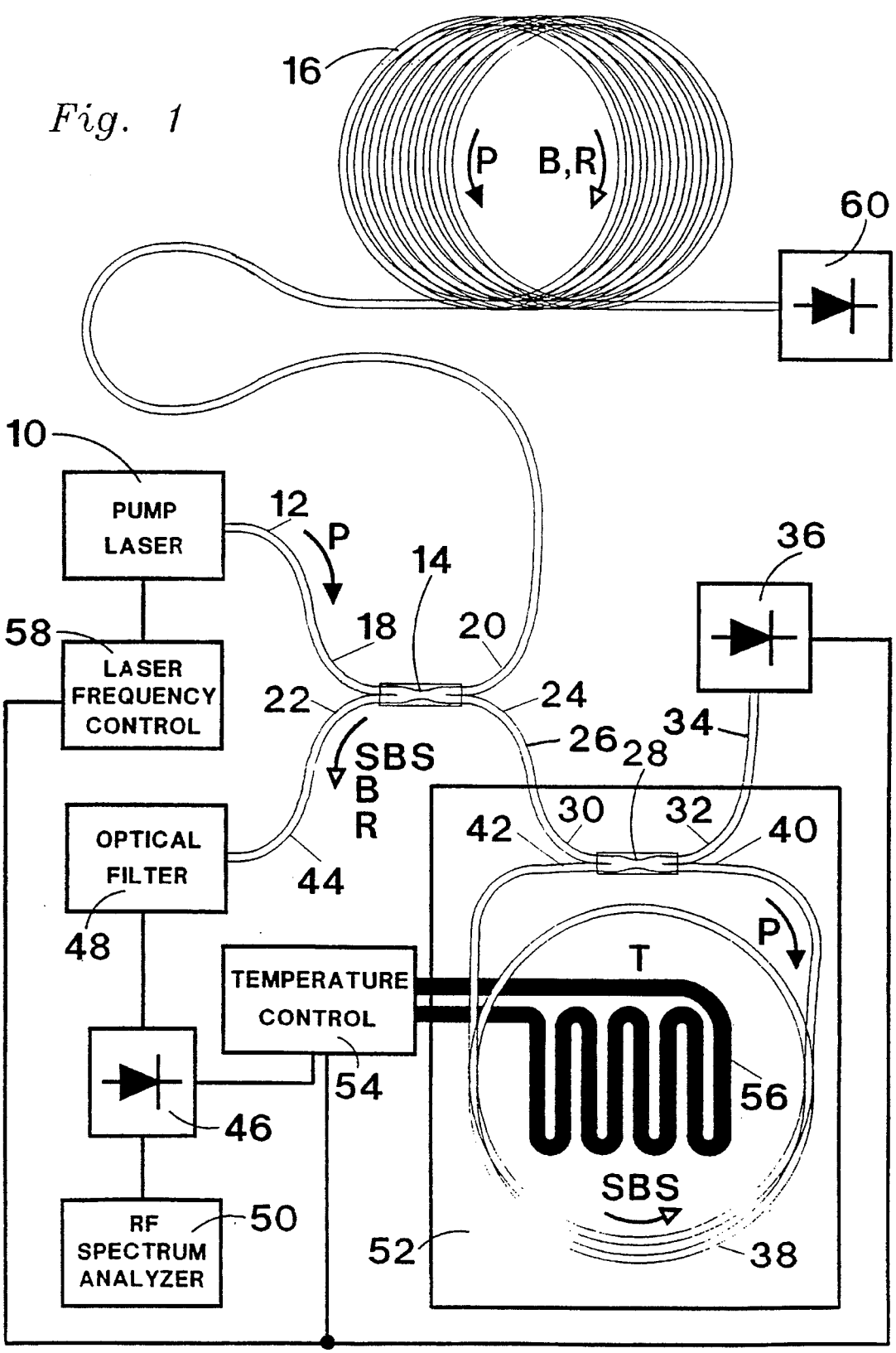
FIG. 1 is a schematic of a device for the investigation of optical fiber lines by means of heterodyne Brillouin spectroscopy.

A pumplaser in FIG. 1 is designated 10. Light P from the pumplaser 10 is coupled via an optical fiber 12 and a four port branching device 14 into an optical fiber line under investigation 16. The four port branching device has four ports 18, 20, 22, and 24, which are arranged in pairs 18 and 22 as well as 20 and 24 opposite to each other. Excitation of any one fiber on any one side distributes the light among the two fibers on the opposite side according to the specific coupling ratio, generally spoken according to the specific scattering matrix of the four port device 14. Pumplight from the pumplaser, which is injected into-the optical fiber 12, is partly directed across ports 18 and 20 into the optical fiber line under investigation 16. Another part of the pumplight in the optical fiber 12 is guided across ports 18 and 24 of the four port device 14 into an optical fiber 26. Optical fiber 26 leads to a four port branching device 28.

The four port device 28 has a first port 30, which is connected with the optical fiber 26. A second port 32 of the four port branching device 28 is optically connected with an optical fiber 34, which leads to a photodetector 36 of the photodiode type.

Across the four port device 28, a fiber ring resonator 38 is coupled to the optical fiber 26. The fiber ring resonator 38 is formed by a closed fiber loop, which penetrates the four port device 28 through ports 40 and 42.

Port 22 of the four port branching device 14 is connected to an optical fiber 44. The optical fiber 44 leads to a photodetector 46 of the photodiode type with a square-law characteristic. In between the optical fiber 44 and the photodetector 46 an optical filter 48 is optically connected. The output signal of the photodetector is electrically connected to an RF-spectrum analyzer.

The fiber ring resonator 38 is installed within a thermocontrolled housing. The temperature T of the thermostat 52 is adjusted by a controller 54. The controller 54 is fed by the signal of the photodetector 36 and by the signal of the photodetector 46. The temperature T of the thermostat 52 is controlled by an adjustment device 56. The signal of the photodetector 36 is furthermore distributed to controller 58. Controller 58 is part of a frequency servo loop for the pumplaser 10.

The so described device works in the following way:

Light P from the pumplaser 10 is coupled into the optical fiber 12 and guided through ports 18 and 20 of the four port branching device 14 into the optical fiber line under investigation 16. A part of the pumplight is directed into the optical fiber 26 by means of the four port device 14 and via port 24. A part of this branched off pumplight is fed into the fiber ring resonator 38 across ports 30 and 40 of the four port device 28.

Part of the pumplight P excites spontaneous Brillouin scattering within the optical fiber line under, investigation 16. Due to the underlying physical mechanism Brillouin scattering has a pronounced maximum into the backward direction. The frequency of this spontaneously Brillouin backscattered light B is shifted to lower frequencies relative to the frequency of the pumplight. A part of the backscattered light B from the optical fiber line under investigation 16 is directed across ports 20 and 22 of the four port branching device 14 to the optical fiber 44, which is optically connected with an optical filter 48, from which a part of the light is guided to a photodetector 46.

A part of the pumplight P, which is directed across ports 18 and 24 of the four port device 14, is coupled through ports 30 and 40 of the four port device 28 into the fiber ring resonator 38. This part of the pumplight P, which resonantly circulates inside the fiber ring resonator 38, excites stimulated Brillouin scattering inside this fiber ring resonator. A coherently backscattered lightwave SBS is generated within the fiber optic ring resonator 38. A part of this coherently backscattered lightwave SBS leaves the fiber optic ring resonator 38 through ports 40 and 30 of the four port device 28 and is guided via the optical fiber 26 and ports 24 and 22 of the four port device 14 into the optical fiber 44. There a part of the coherently backscattered lightwave SBS, which was originally generated within the fiber optic ring resonator 38, is superimposed on the lightwave B, which was backscattered from the optical fiber line under investigation. There is Rayleigh scattering, designated R in FIG. 1, generated by the pumplaser 10. The frequency of this Rayleigh scattering is closely distributed around the frequency of the pumplaser 10. This Rayleigh scattering is blocked by the optical filter, which is transparent for the frequency range containing the spontaneously Brillouin backscattered light B from the optical fiber line under investigation 16 and the frequency of the coherently backscattered lightwave SBS from the fiber optic ring resonator 38.

The frequency distribution of the coherently backscattered lightwave SBS from the fiber optic ring resonator 38 is extremely narrow. The linewidth of this "reference laser" is smaller than 1 KHz. Then the superposition of the electric fields of the spontaneously backscattered light B and the "reference laser" SBS can be expressed in good approximation:

$$E(t) = 1/2 \left[ (E_{Bo}/(2\pi)) \int_{-\infty}^{+\infty} g(w)\exp(-iwt)dw + E_{Ref}\exp(iw_{Ref}t) + \ldots + \text{complex conjugated} \right];$$

where
$w_{Ref}=2\pi f_{Ref}$=Frequency of the "reference laser",
$E_{Bo}$=Peak value of the electrical field of the spontaneously Brillouin backscattered light SBS,
$g(w)$=Spontaneous Brillouin spectrum of the optical fiber line under investigation 38,
$E_{Ref}$=Electrical field of the "reference laser".

Neglecting rapidly oscillating terms the signal at the photodetector 46 can be written:

$I(t) = E E^* =$ $$\text{Const.} + 2E_{Ref}(E_{Bo}/(2\pi)) \int_{-\infty}^{+\infty} g(w)\exp(-i(w-w_{Ref})t)dw.$$

The spectrum of the time dependent intensity I(t) reveals the Brillouin spectrum g(w) on a frequency scale, which is reduced by $w_{Ref}$ e.g. by means of Fourier transforming I(t). The spectrum analyzer 50 delivers a spectrum by displaying the amplitude on its ordinate and the frequency on its abscissa. The spectrum of the detector signal corresponds to the spontaneous Brillouin spectrum $g(w-w_{Ref})$ of the optical fiber line under investigation 16, times the constant factor 2 $E_{Ref} E_{Bo}$.

The intermediate frequency IF is defined by
$IF=f_{Peak}-f_{Ref}$,
where $f_{Peak}$ refers to the center of gravity of the spontaneous Brillouin spectrum g(w). The intermediate frequency IF can be adjusted within a range from zero to several hundred MHz by the choice of the fiber material of the ring resonator 38 and adjustment of its temperature. Therefore it is possible to position the frequency of the "reference laser", $v_{Ref}$, close to the spontaneous Brillouin spectrum g(w) of the optical fiber line under investigation 16. This results in an increased spectral resolution of several orders of magnitude compared to devices mentioned above, where part of the pumplight P is heterodyned with the spontaneous Brillouin backscattering from the optical fiber under test. There, intermediate frequencies in the range of 10 to 15 GHz have to be detected. However, that requires an extremely fast photodiode as well as sophisticated HF-spectrum analyzer equipment for further processing, compared to this invention, which requires only an inexpensive photodiode 46 with a bandwidth of less than 1 GHz, and a comparatively inexpensive RF-spectrum analyzer 50.

A preferred embodiment of the invention uses a ring resonator with a special fiber material, which exhibits a Brillouin frequency shift, which is defined as the frequency difference between the pumplight and the stimulated Brillouin backscattering, as large as possible. Then for spontaneous Brillouin resonances $f_i$ of an optical fiber line under investigation 16 the relation $f_{Ref} < f_i$ holds, and the difference spectrum is displayed on the spectrum analyzer 50 in descending order of the specific Brillouin frequency shift, which simplifies the spectral analysis. This can be arranged by choosing a core material of pure $SiO_2$-glass and a cladding material of heavily $F^-$-doped $SiO_2$-glass (cf. the paper of Shibata et al.). By means of the pumplight signal at detector 36 and control electronics, the pumplaser 10 is stabilized to the center of a resonance of the ring resonator 38. This situation is characterized by a minimum signal level at detector 36. The pumplaser 10 excites the "reference laser" inside the ring resonator through stimulated Brillouin scattering. The Brillouin shift is temperature dependent, that means the frequency position of the Brillouin gain spectrum depends on temperature. The frequency positions of the resonances of the ring resonator 38 are temperature dependent, too. The temperature dependence of the Brillouin shift and the resonance frequencies of the ring resonator is generally different. Inside the ring resonator 38, this allows for a temperature tuning of the Brillouin spectrum relative to the resonances of the ring resonator 38. A controller 54 adjusts the temperature T of the thermostat in a way, that the Brillouin spectrum peaks exactly at a resonance frequency of the ring resonator. This situation is characterized by a maximum dc signal level at detector 46. The temperature tuning coefficient of the Brillouin gain spectrum relative to the resonances of the ring resonator 38 is in the order of MHz/K. Even simple temperature control electronics with a temperature stabilization of less than 0.1K ensures a relative frequency accuracy of better than 1 MHz for the heterodyne signal at detector 46.

Figure 2:
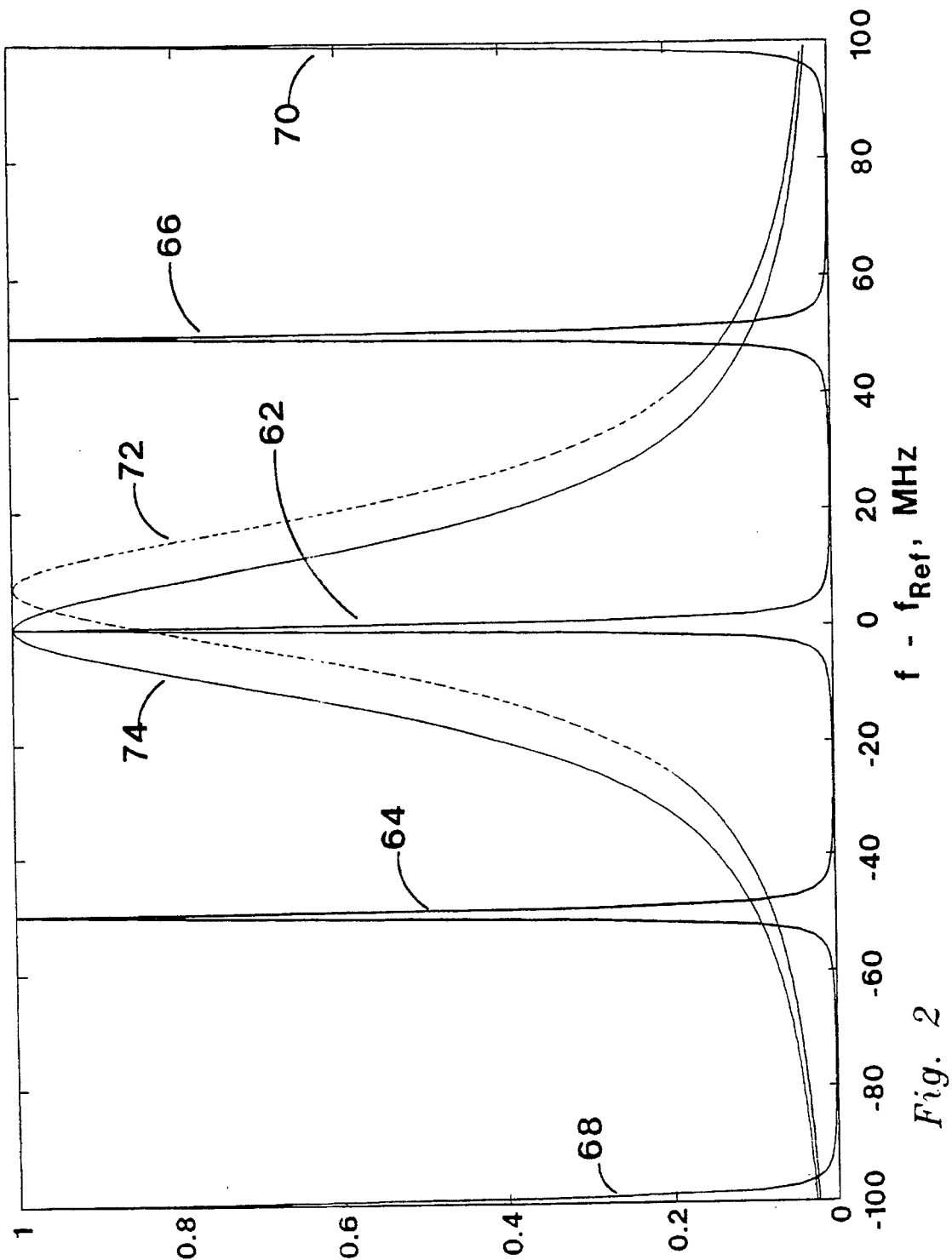
FIG. 2 displays a Brillouin gain profile of an optical fiber superimposed with resonance peaks of an optic ring resonator in the frequency domain.

Well defined points of operation of the "reference laser" can be arranged by appropriate choice of the free spectral range of the ring resonator 38. This is indicated in FIG. 2, where a comb of resonances 62, 64, 66, 68, and 70 with their specific resonance frequencies is displayed in the frequency domain. As an example, the Brillouin gain spectrum 72 is sketched with a broken line. Adjusting the temperature T of the thermostat 52 allows for a matching of the peak of the Brillouin gain spectrum with the peak of resonance 62 of the ring resonator 38, as indicated by curve 74. If the mismatch between Brillouin gain spectrum and a certain resonance of the ring resonator 38 is too large to be compensated for by temperature adjustment of the thermostat, temperature tuning to another well defined resonance 64, 66, 68 or 70 is possible. A typical temperature difference for tuning from one resonance to the next neighbor is about 40° C. This allows for applications of the device in the field even under difficult environmental conditions.

The output signals of the spectrum analyzer 50 can be analyzed by data processing equipment. Peak positions can be located and peak width values can be extracted from the spontaneous Brillouin spectrum. With that information and eventually by application of pattern matching algorithms a quantitative characterization of the fiber material of the optical fiber line under investigation 16 can be done.

What is claimed is:

1. A device for the investigation of optical fiber lines by means of heterodyne Brillouin spectroscopy, comprising a pumplaser for deriving light, a first four-port device having first, second third and fourth ports and a second four-port device having fifth, sixth, seventh and eighth ports being connected to the pumplaser via plural fiber strands, a first portion of said light from the pumplaser being directed into one end of the optical fiber under investigation through first and second ports of the first four-port device for inducing spontaneous Brillouin backscattering of the first portion of light in said optical fiber line, further comprising a ring resonator for receiving a second portion of the light from the pumplaser through first and third ports of the first four-port device and through fifth and seventh ports of the second four-port device, for generating stimulated Brillouin scattering inside the ring resonator and for superimposing with the backscattered first portion of light from the optical fiber line under investigation, an optical filter connected to a fourth port of the first four-port device and a first detector connected to the optical filter for receiving the stimulated Brillouin scattering from the ring resonator as well as the spontaneous Brillouin scattering from the optical fiber line and for outputting signals, and a spectrum analyzer connected to the first detector for receiving and analyzing said output signals.

2. The device of claim 1, wherein the first four-port branching device is provided between the pumplaser and the optical fiber line under investigation, wherein the first port is optically connected with the pumplaser via one of said plural fiber strands for distributing light from the pumplaser to a second port connected to the optical fiber under investigation, and wherein the third port is optically connected to the ring resonator through the second four-port device, such that light from the pumplaser directed from the third port of the first four-port branching device is resonantly coupled to the ring resonator for supplying the light from the pumplaser and for inducing stimulated Brillouin scattering inside the ring resonator, and for routing a part of the backscattered lightwave generated by stimulated Brillouin scattering inside the ring resonator through the second-four-port device and from the third port of the first four-port branching device to the fourth port and to the optical filter and the first detector.

3. The device of claim 2, further comprising a second detector connected to the pumplaser, a controller connected to the second detector, wherein light from the pumplaser is directed through a fiber strand across the first and the third ports of the first four-port device and through a fiber strand across the fifth and sixth ports of the second four-port device to the second detector, for deriving a signal in the second detector and effecting frequency adjustments of the pumplaser and the controller.

4. A device according to claim 1, and further including means (54,56) for controlling the frequency of the light, which is generated by stimulated Brillouin scattering inside the ring resonator (38).

5. A device according to claim 4, wherein the means for controlling the frequency of the light, which is generated inside said ring resonator (38), are means (54,56) for thermo-controlled adjustments of the temperature of said ring resonator (38).

6. A device according to claim 4, wherein the frequency position of the peak of the Brillouin gain profile (74) is matched with a resonance of said ring resonator (38).

7. A device according to claim 6, wherein a first servo-loop (36,58) is provided to stabilize the frequency of the pumplaser (10) on to a resonance of said ring resonator (38) and a second servo-loop (36,54,56) is provided to stabilize the frequency position of the peak of the Brillouin gain profile on to a resonance of said ring resonator (38).

8. A device according to claim 1, wherein in front of the detector (46) the optical filter (48) is optically connected to suppress light, which has the same frequency as the pumplaser (10).

9. A device according to claim 1, wherein the detector (46) has a square-law characteristic.

10. An apparatus for analyzing optical fiber lines by means of heterodyne Brillouin spectroscopy comprising a pumplaser for deriving a plurality of light, a first portion of said light being directed into one end of the optical fiber to be analyzed by inducing spontaneous Brillouin backscattering of the first portion of light in the optical fiber line, a ring resonator connected to the pumplaser for receiving a second portion of the light derived from the pumplaser and for generating stimulated Brillouin scattering of the second portion of light, the second portion of light scattered from the ring resonator being superimposed with the backscattered first portion of light, a first detector connected to the pumplaser and the ring resonator for receiving the first and second backscattered portions of light and for outputting corresponding signals, a spectrum analyzer connected to the first detector for receiving and analyzing the signals.

11. The apparatus of claim 10, further comprising first and second controllers for controlling frequency of the light generated by stimulated Brillouin scattering inside the ring resonator.

12. The apparatus of claim 11, wherein the first and second controllers comprise means for thermo-controlled adjustments for adjusting the temperature of the ring resonator.

13. The apparatus of claim 11, wherein a frequency position of a peak of a Brillouin gain profile is matched to correspond with a resonance of said ring resonator.

14. The apparatus of claim 13, further comprising a first servo-loop for stabilizing a frequency of the pumplaser corresponding to the resonance of the ring resonator, and a second servo-loop for stabilizing the frequency position of the peak of the Brillouin gain profile corresponding to the resonance of the ring resonator.

15. The apparatus of claim 10, further comprising a four port branching device between the pumplaser and the optical fiber line to be analyzed, wherein a first port is optically connected with the pumplaser to direct light from the pumplaser to a second port, the second port being connected to the optical fiber, and a third port is optically connected to the ring resonator, a coupling device connecting the third port to the ring resonator, and a fiber loop provided within the ring resonator, a fourth port for optically connecting the four port device with the first detector, wherein light from the pumplaser passing through the first and second ports is directed to the optical fiber to induce spontaneous Brillouin backscattering in the optical fiber and is re-routed through the second and the fourth ports to the first detector, and wherein light from the pumplaser passing through the first and third ports is resonantly coupled with the ring resonator for inducing stimulated Brillouin scattering inside the ring resonator and re-routing through the coupling device, the third port, the four port branching device and the fourth port to the first detector such that light re-routed from the optical fiber is superimposed by light re-routed from the ring resonator within the fourth port.

16. The apparatus of claim 15, further comprising a second detector for receiving light from the pumplaser being directed through the coupling device and deriving the signals and for allowing frequency adjustments of the pumplaser with a controller.

17. The apparatus of claim 10, further comprising an optical filter optically connected to the detector for suppressing light having a frequency similar to a frequency of light from the pumplaser.

18. The apparatus of claim 10, wherein the detector has a square-law characteristic.

19. A method for analyzing optical fibers by means of heterodyne Brillouin spectroscopy comprising the steps of:

deriving a plurality of light from a pumplaser;

directing a first portion of said light into one end of the optical fiber to be analyzed by inducing spontaneous Brillouin backscattering of the first portion of light in the optical fiber line;

providing a second portion of light from the pumplaser to a ring resonator connected to the pumplaser and generating stimulated Brillouin scattering of the second portion of light;

superimposing the second portion of light backscattered from the ring resonator on the backscattered first portion of light from the optical fiber;

detecting the backscattered first and second portions of light by means of a first detector connected to the pumplaser and the ring resonator and outputting corresponding signals; and receiving and analyzing the signals from the first detector by means of a spectrum analyzer connected to the first detector and outputting a result of the analyzed signals.

20. The method of claim 19, further comprising controlling frequency of the light generated by stimulated Brillouin scattering inside the ring resonator by means of first and second controllers.

21. The method of claim 20, further comprising providing thermo-controlled adjustments on the first and second controllers for adjusting temperature of the ring resonator.

22. The method of claim 20, further comprising matching a frequency position of a peak of a Brillouin gain profile with a resonance of the ring resonator.

23. The method of claim 22, further comprising stabilizing a frequency of the pumplaser to correspond to the resonance of the ring resonator by means of a first servo-loop, and stabilizing the frequency position of the peak of the Brillouin gain profile to correspond to the resonance of the ring resonator by means of a second servo-loop.

24. The method of claim 19, further comprising optically connecting a four port branching device between the pumplaser and the optical fiber line to be analyzed by means of a first port and directing light from the pumplaser to a second port connected to the optical fiber, and optically connecting a third port to the ring resonator, providing a coupling device for connecting the third port to the ring resonator, and providing a fiber loop within the ring resonator, optically connecting a fourth port from the four port device with the first detector, and further directing light from the pumplaser through the first and second ports to the optical fiber and inducing spontaneous Brillouin backscattering in the optical fiber and re-routing through the second and the fourth ports to the first detector, and resonantly coupling light from the pumplaser passing through the first and third ports with the ring resonator for inducing stimulated Brillouin scattering inside the ring resonator and re-routing through the coupling device, the third port, the four port branching device and the fourth port to the first detector and superimposing light re-routed from the optical fiber by light re-routed from the ring resonator within the fourth port.

25. The method of claim 24, further comprising providing light from the pumplaser through the coupling device to a second detector and deriving signals for allowing frequency adjustments of the pumplaser with a controller.

26. The method of claim 19, further comprising optically connecting an optical filter to the detector for suppressing light having a frequency similar to a frequency of light from the pumplaser.

* * * * *